(12) United States Patent
Kikuyama et al.

(10) Patent No.: US 8,066,898 B2
(45) Date of Patent: Nov. 29, 2011

(54) SURFACE TREATMENT SOLUTION FOR THE FINE SURFACE PROCESSING OF A GLASS SUBSTRATE CONTAINING MULTIPLE INGREDIENTS

(75) Inventors: Hirohisa Kikuyama, Izumiootsu (JP);
Tatsuhiro Yabune, Izumiootsu (JP);
Masayuki Miyashita, Aizumiootsu (JP);
Tadahiro Ohmi, Sendai (JP)

(73) Assignee: Stella Chemifa Kabushiki Kaisha, Osaka (JP)

( * ) Notice: Subject to any disclaimer, the term of this patent is extended or adjusted under 35 U.S.C. 154(b) by 488 days.

(21) Appl. No.: 12/237,981

(22) Filed: Sep. 25, 2008

(65) Prior Publication Data

US 2009/0075486 A1    Mar. 19, 2009

Related U.S. Application Data

(62) Division of application No. 10/487,770, filed as application No. PCT/JP02/08564 on Aug. 26, 2002, now abandoned.

(30) Foreign Application Priority Data

Aug. 24, 2001 (JP) .................................. 2001-255387

(51) Int. Cl.
*B44C 1/22* (2006.01)
(52) U.S. Cl. ............. 216/97; 216/99; 216/103; 438/753
(58) Field of Classification Search .................... 216/83, 216/97, 99, 103, 106; 438/753, 756
See application file for complete search history.

(56) References Cited

U.S. PATENT DOCUMENTS

| | | | |
|---|---|---|---|
| 4,080,188 A | | 3/1978 | Doddato et al. |
| 5,091,053 A | | 2/1992 | Blonder et al. |
| 5,256,247 A | * | 10/1993 | Watanabe et al. ............... 216/16 |
| 5,448,672 A | | 9/1995 | Blonder et al. |
| 5,609,773 A | | 3/1997 | Usui et al. |
| 5,885,477 A | * | 3/1999 | Rasmussen et al. ......... 252/79.2 |
| 6,613,693 B1 | * | 9/2003 | Heo et al. ...................... 438/745 |
| 6,709,875 B2 | * | 3/2004 | Gilbert et al. ..................... 438/3 |

FOREIGN PATENT DOCUMENTS

| | | |
|---|---|---|
| EP | 0444809 | 9/1991 |
| FR | 2 682 946 | 4/1993 |
| GB | 2 065 097 | 12/1980 |
| JP | 52-144020 | 1/1977 |
| JP | 53084018 | 7/1978 |
| JP | 57-47744 | 3/1982 |
| JP | 4185693 | 7/1992 |
| JP | 06-333912 | 12/1994 |
| JP | 7172866 | 7/1995 |
| JP | 10-036140 | 2/1998 |
| JP | 2000-164586 | 6/2000 |
| JP | 2002-110554 | 4/2002 |

OTHER PUBLICATIONS

A study of the tchant for FPD Glass Substrate.

* cited by examiner

*Primary Examiner* — Lan Vinh
(74) *Attorney, Agent, or Firm* — Young & Thompson

(57) ABSTRACT

A surface treatment solution for finely processing a glass substrate containing multiple ingredients is used for the construction of liquid crystal-based or organic electroluminescence-based flat panel display devices without invoking crystal precipitation and/or increasing surface roughness. An etching solution of the invention contains, in addition to hydrofluoric acid (HF) and ammonium fluoride ($NH_4F$), at least one acid whose dissociation constant is larger than that of HF. The concentration of the acid in the solution can advantageously be adjusted to maximize the etching rate.

16 Claims, 3 Drawing Sheets ated but was mechanically thinned, i.e., it was obtained by mechanically thinning a mother glass plate.
SURFACE TREATMENT SOLUTION FOR THE FINE SURFACE PROCESSING OF A GLASS SUBSTRATE CONTAINING MULTIPLE INGREDIENTS

BACKGROUND OF THE INVENTION

1. Field of the Invention

The present invention relates to a surface treatment solution for finely processing the surface of a glass substrate containing multiple ingredients. More specifically, the present invention relates to a surface treatment solution, useful for the fine surface processing of glass substrates, containing cation-yielding elements and their cation-yielding oxides, which is very profitably used for wet-etching/cleaning the surface of such glass substrates or etching/cleaning the surface of such glass substrates carrying finely fabricated semiconductor elements thereon during the fabrication of semiconductor devices.

2. Related Art

In the wet processing of glass panels for flat panel display devices, pattern-etching/cleaning of glass substrates containing cation-yielding elements and their cation-yielding oxides and purification/fine-processing of pattern-etched such glass substrates using an etching solution has been put into practice. Yet, demand for a technique enabling the more fine processing of glass substrates has become increasingly acute with the advent of more highly resolved display devices. For the fine surface processing of glass substrates which will serve as display panels, hydrofluoric acid (HF) or a mixture (buffered hydrofluoric acid (BHF)) of hydrofluoric acid (HF) and ammonium fluoride ($NH_4F$) has been used as an important and indispensable agent for etching/cleaning glass substrates. However, demand for an etching agent enabling finer processing of glass substrates becomes manifest to further improve the performance and resolution of display devices.

Glass substrates to be used for the construction of liquid crystal (LC)-based or organic electroluminescence (EL)-based flat panel display devices have come to have an increasingly reduced thickness to meet the demand for more compact and power-saving display devices. In the manufacture of such glass substrates, however, the so-called mother glass plate has an increasingly larger size to improve the production efficiency and reduce the production cost. A glass substrate is obtained by thinning a mother glass plate.

However, the mechanical thinning of a mother glass plate has a limitation, because a mother glass plate must have strength sufficiently high enough to withstand stresses imposed during the thinning process. Therefore, if further thinning is required for a mechanically thinned glass plate (coarse glass substrate), the coarse glass substrate must be subjected to another kind of fine processing, e.g., chemical fine processing.

However, if a coarse glass substrate containing multiple ingredients, particularly cation-yielding elements and their oxides, is etched/cleaned by means of a conventional etching solution comprising HF or BHF, following two problems are encountered which interfere with the uniform etching/cleaning.

1) Crystals develop on the surface of a glass substrate and adhere thereto.

2) The surface of a glass substrate becomes significantly roughened after the treatment.

With regard to the problem 1), analysis of crystals adhered to the surface of a glass substrate revealed that it is composed of fluorides of cation-yielding elements contained in the glass substrate. Fluorides of cation-yielding elements have such a low solubility to HF and BHF as well as to water, that they are easily crystallized to adhere onto the surface of a glass substrate. The present inventors succeeded in reaching this finding for the first time.

The problem 2) was ascribed to that crystals developed on the surface of a glass substrate and adhered thereto interfere with etching and/or that cation-yielding elements and their oxides contained in a glass substrate are differently susceptible to etching, which causes the local variation in etching rate and etching amount. The present inventors succeeded in obtaining this knowledge for the first time.

The most important point of the technique for finely processing glass substrates is to uniformly process or treat glass substrates while preventing the occurrence of surface roughness.

SUMMARY OF THE INVENTION

The present invention provides a surface treatment solution for uniformly processing the surface of glass substrates containing multiple ingredients such as glass substrates to be used for the construction of LC-based or organic EL-based flat panel display devices, with which it is possible to etch such glass substrates without invoking crystal precipitation and surface roughness.

The present inventors had studied hard to solve the above problems, and found that it is possible to solve the above problems by providing a surface treatment solution which is specifically adapted for the fine processing of glass substrates containing multiple ingredients, the treatment solution containing, in addition to HF and $NH_4F$, at least one acid whose dissociation constant is larger than that of HF. This finding led the inventors to the present invention.

A first aspect of the present invention is to provide a surface treatment solution for finely processing a glass substrate containing multiple ingredients which contains as a uniform mixture, in addition to HF and $NH_4F$, at least one acid whose dissociation constant is larger than that of HF.

A second aspect of the present invention is to provide a surface treatment solution for finely processing a glass substrate containing multiple ingredients which contains as a uniform mixture, in addition to HF and $NH_4F$, at least one acid whose dissociation constant is larger than that of HF such that, if the solution is applied to a heated silicon oxide film having a certain thickness, and the etching rate f(x) [Å/min] is plotted as a function of the concentration x [mol/kg] of the acid in the solution, and it is found that f(x) takes a maximum $f(x_1)$ when $x=x_1$, the concentration x of the acid in the solution is adjusted to be $x>x_1$.

A third aspect of the present invention is to provide a surface treatment solution for finely processing a glass substrate containing multiple ingredients which contains as a uniform mixture, in addition to HF and $NH_4F$, at least one acid whose dissociation constant is larger than that of HF such that, if the solution is applied to a heated silicon oxide film having a certain thickness, and the etching rate f(x) [Å/min] is plotted as a function of the concentration x [mol/kg] of the acid in the solution, and it is found that f(x) takes a maximum $f(x_1)$ when $x=x_1$ and a minimum $f(x_2)$ when $x=x_2$ ($x_1<x_2$), the concentration x of the acid in the solution is adjusted to be in the following range:

$$x_2-(x_2-x_1)/2<x<x_2+(x_2-x_1)/2.$$

A fourth aspect of the present invention is to provide a surface treatment solution as described in any one of the foregoing aspects of the invention for finely processing a glass substrate containing multiple ingredients, which contains as a uniform mixture, in addition to HF and $NH_4F$, at least one inorganic acid either monovalent or multivalent, whose dissociation constant is larger than that of HF.

A fifth aspect of the present invention is to provide a surface treatment solution as described in any one of the foregoing aspects of the invention for finely processing a glass substrate containing multiple ingredients wherein the acid whose dissociation constant is larger than that of HF is one or more chosen from the group comprising HCl, HBr, $HNO_3$, and $H_2SO_4$.

A sixth aspect of the present invention is provide a surface treatment solution as described in any one of the foregoing aspects of the invention for finely processing a glass substrate containing multiple ingredients which further contains a surfactant at 0.0001 to 1 wt %.

A seventh aspect of the present invention is to provide a surface treatment solution as described in any one of the foregoing aspects of the invention for finely processing a glass substrate containing multiple ingredients, particularly a glass substrate containing, in addition to silicates or its main ingredient, one or more elements chosen from the group comprising Al, Ba, Ca, Mg, Sb, Sr and Zr.

An eighth aspect of the present invention is to provide a surface treatment solution as described in any one of the foregoing aspects of the invention for finely processing a glass substrate containing multiple ingredients, particularly a glass substrate used for the construction of a flat panel display device.

A ninth aspect of the present invention is to provide a surface treatment solution as described in any one of the foregoing aspects of the invention for finely processing a glass substrate containing multiple ingredients, which contains HF at 25 mol/kg or lower.

A tenth aspect of the present invention is to provide a surface treatment solution as described in any one of the foregoing aspects of the invention for finely processing a glass substrate containing multiple ingredients, which contains $NH_4F$ at 0.001 to 11 mol/kg.

An eleventh aspect of the present invention is to provide a surface treatment solution as described in any one of the foregoing aspects of the invention for finely processing a glass substrate containing multiple ingredients wherein, if etching is performed at an appropriate temperature using an acid-added etching solution with the concentration x of acid being varied, and it is found that crystal precipitation remains inhibited as long as x is below $x_3$ or the maximum effective concentration, the concentration x of acid in the solution is adjusted to be $x<x_3$ [mol/kg].

BRIEF DESCRIPTION OF THE DRAWINGS

The above-mentioned and other features and advantages of this invention, and the manner of attaining them, will become more apparent and the invention will be better understood by reference to the following descriptions of the embodiments of the invention taken in conjunction with the accompanying drawings, wherein.

Corresponding reference characters indicate corresponding parts through the several views. The exemplifications set out herein illustrate preferred embodiments of the invention, in one form, and such exemplifications are not to be construed as limiting the scope of the invention in any manner.

DETAILED DESCRIPTION

Figure 1:
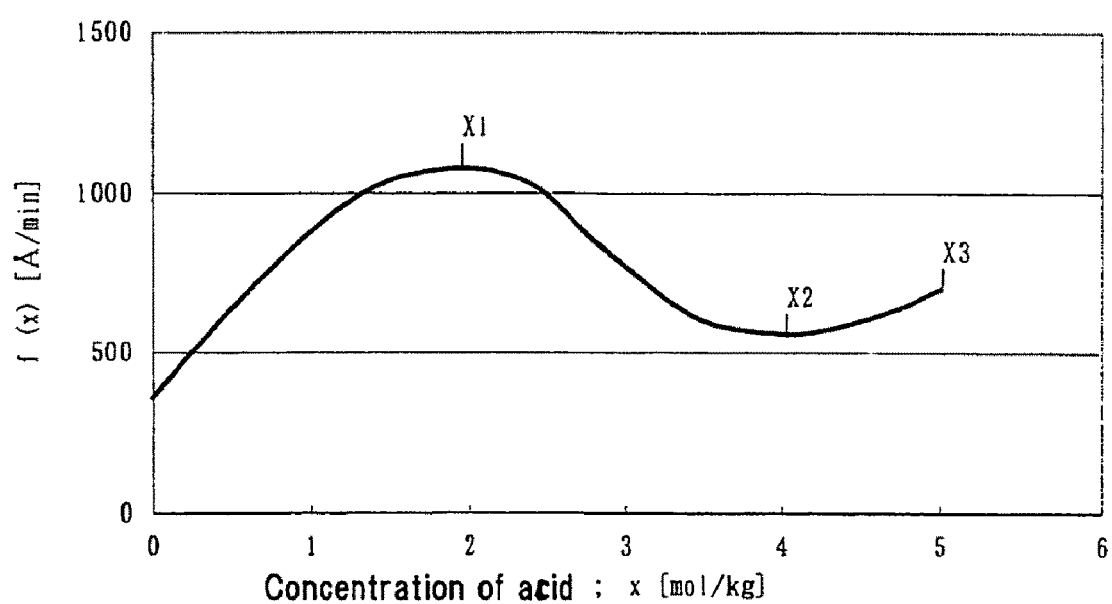
FIG. 1 shows a graph relating the etching rate f(x) with the concentration of x of the acid in the solution, when etching solutions containing an acid whose dissociation constant is larger than that of HF at different concentrations are applied to a heated silicon oxide film the change of etching rate being traced.

The present invention will be detailed below. First, the present inventors inquired about the causes responsible for the formation of crystals and surface roughness.

As a result of etching, metal elements contained in a glass substrate dissolve in an etching solution to turn into cations there. Those cations derived from the etched glass substrate react with anions derived from anion-yielding species in the etching solution. For example, the cations react with fluorine ions ($F^-$ ions) to produce metal salts (e.g., fluoride salts). As such metal salts are hardly soluble to the etching solution, they crystallize on the surface of the substrate and deposit there. This crystal deposition on the surface of the glass substrate interferes with surface etching which causes the etched surface to be roughened, and the overall glass surface to look cloudy.

If etching is performed on a glass substrate containing multiple ingredients such as cation-yielding elements and their oxides, etching proceeds at widely different speeds according to localities because of the ingredients having greatly different susceptibilities to etching, which may cause the etched surface to be roughened and irregular in profile.

To solve these problems, it is necessary to make uniform the susceptibilities to etching of different ingredients contained in a glass substrate, and to inhibit the development of fluorides insoluble to an etching solution which are derived from the cations emerging as a result of dissolution of the ingredients to the etching solution. For this purpose, it is most important and desirable to allow the ingredients, once they are dissolved in an etching solution, to stably stay there as cations.

An effective measure for inhibiting the development of fluorides which are hardly soluble to an etching solution is to modify the reaction system in such a manner as to lower the concentration of $F^-$ ion in the etching solution.

However, since the main ingredient of a glass substrate is silicon oxide, in order to etch a glass substrate having such a composition, the etching solution must include substances such as HF or BHF that can dissolve silicon oxide.

On the other hand, $HF^{2-}$ ions act as dominant ions in the etching of silicon oxide.

Accordingly, in order to uniformly etch a glass substrate containing multiple ingredients, it is necessary not only to reduce the concentration of F⁻ ions in an etching solution but also to promote the efficient generation of $HF^{2-}$ ions in the solution. This purpose can be achieved by adding an appropriate amount of acid whose dissociation constant is larger than that of HF, to an etching/cleaning solution including at least either HF or $NH_4F$, because then the dissociation of HF in the solution will become controllable. On the contrary, if an acid whose dissociation constant is equal to or less than that of HF is added to the same etching/cleaning solution, the efficient production of $HF^{2-}$ will be hardly achievable.

In view of this, an etching solution according to the invention must include, in addition to HF and $NH_4F$, at least one acid (high-ionizing acid) which has a larger dissociation constant than HF.

The etching solution of the invention for glass substrates containing multiple ingredients preferably contains an acid (high-ionizing acid) whose dissociation constant is larger than that of HF at a concentration of x [mol/kg]. Further, the x should be $x \leq x_3$ where $x_3$ represents the maximum concentration at which deposition of crystals on a glass substrate can be prohibited at a temperature appropriate for etching. At such a concentration, the composition of the etching solution becomes uniform, and roughening of the etched glass surface is inhibited. If $x > x_3$, crystal precipitates developed in the etching solution may adhere to the surface of a glass substrate to cause the etched glass surface to be roughened, or crystal precipitates may be brought into contact with a surface of the container to be broken into fine particles which may adhere to the surface of a glass substrate to cause it to be roughened.

The performance of an etching solution may be evaluated by applying the solution to a heated silicon oxide film having a certain thickness, measuring the thinning of the film over time, and determining the etching rate (thinning per unit time). In the same context, the performance of an etching solution containing a high-ionizing acid may be evaluated by plotting the etching rate f(x) [Å/min] as a function of the concentration (x) of the acid. The species of the acid is preferably chosen such that f(x) takes a maximum $f(x_1)$ when $x=x_1$ ($x_1<x_3$), and a minimum $f(x_2)$ when $x=x_2$ ($x_1<x_2$). This is because ingredients of a glass substrate are highly soluble to an etching solution containing an acid chosen as described above, particularly to an etching solution whose acid satisfies the latter requirement.

Next, the reason why the added amount of a high-ionizing acid should be adjusted to make the concentration x of the acid in the solution fall in the above range will be described.

In an etching solution comprising HF or BHF, HF and $NH_4F$ dissociate into respective positive and negative ions, and thus F⁻ ions are produced. F⁻ ions react with H⁺ ions in the solution to produce HF, a bound compound including $HF^{2-}$, or an ion. If an acid (high-ionizing acid) whose dissociation constant is larger than that of HF is added to the etching solution, H⁺ ions (newly added) react with F⁻ ions in the solution to produce HF or a bound compound with $HF^{2-}$ ions.

Thus, free F⁻ ions are consumed and their concentration is reduced. As a consequence, $HF^{2-}$ ions become dominant with the increased addition of the acid. If the performance of such an acid-added etching solution is evaluated by applying the solution to a heated silicon oxide film and by plotting the etching rate f(x) as a function of the concentration (x) of the acid, the etching rate f(x) increases with the increase of x, reaching a maximum $f(x_1)$ at a certain value of x ($x=x_1$).

However, if the concentration x is further increased, reaction system may undergo following reactions to maintain the acid-base equilibrium: $HF^{2-}$ ions are decomposed into HF and F⁻ ions, and the F⁻ ions react with newly added H⁺ ions to produce HF. As a consequence, the concentration of $HF^{2-}$ ions is reduced, which leads to the reduction of the etching rate. Then, the etching rate f(x) reaches a minimum $f(x_2)$ at a certain value of x ($x=x_2$).

With the further increase of x, the etching rate f(x) starts to rise again.

As seen from the above description, it is possible to control the dissociation state of ions in an etching solution, particularly to reduce the concentration of F⁻ ions in the solution, by adding to the solution an acid whose dissociation constant is larger than that of HF.

If a high-ionizing acid as described above is added to an HF-based etching solution at a concentration higher than $x_1$ or the concentration that gives a maximum of f(x) or $f(x_1)$, thereby controlling the concentration of F⁻ ions in the solution, it is possible to inhibit the formation of the fluorides of cation-yielding elements contained in a glass substrate, i.e., fluorides hardly soluble to the solution.

The amount of a high-ionizing acid added to an etching solution is preferably adjusted such that the concentration x of the acid in the solution is in the following range:

$$x_2-(x_2-x_1)/2 < x < x_2+(x_2-x_1)/2.$$

This is because then it is possible to prevent the adhesion of crystal precipitates to the etched surface, to minimize any increase in surface roughness, and to maintain the original transparency of the glass substrate throughout the etching process. The concentration in question is more preferably in the following range:

$$x_2-(x_2-x_1)/3 < x < x_2+(x_2-x_1)/3, \text{ and}$$

most preferably in the following range:

$$x_2-(x_2-x_1)/4 < x < x_2+(x_2-x_1)/4.$$

With regard to the concentration of x ($=x_2$) [mol/kg] at which f(x) takes a minimum or $f(x_2)$, if $x_2+(x_2-x_1)/2 \geq x_3$, the concentration x of a high-ionizing acid is preferably adjusted to be in the range:

$$x_2-(x_2-x_1)/2 < x < x_3.$$

If the f(x) of an acid-added etching solution does not exhibit any minimum even when the concentration x [mol/kg] is varied, i.e., there is no x that gives a minimum of f(x), the concentration x of a high-ionizing acid is preferably adjusted to be in the range:

$$x_1-(x_3-x_1)/2 < x < x_3.$$

The species of acid is not limited to any specific one, but may include inorganic acids such as hydrochloric acid, nitric acid, sulfuric acid, hydrobromic acid, and the like, and organic acids such as oxalic acid, tartaric acid, iodoacetic acid, fumaric acid, maleic acid, and the like. Preferably, the acid is a hydrophilic acid, because it facilitates, when added to an etching solution, the uniform dispersal of the solutes of the solution. Preferably, the acid is an inorganic acid because it, when added to an etching solution, can prevent the etched surface from being contaminated by organic materials. Among inorganic acids, hydrochloric acid, nitric acid, sulfuric acid and hydrobromic acid are most preferred because they have a higher dissociation constant.

The acid may include multivalent acids as well as monovalent acids. The use of a multivalent acid may be advantageous because it gives a larger amount of H⁺ ions at a given concentration.

To achieve the effect according to the invention, hydrochloric acid (HCl) is particularly preferred because it has a most balanced action. However, the preferable species of acid should be determined in accordance with the cation-yielding elements and their oxides contained in a glass substrate to be treated, together with the concentrations of those elements and oxides.

The acid may comprise one kind of acid or multiple kinds of acids.

Preferably, the etching solution further contains a surfactant to enhance the uniform etching, improve the affinity of the etched surface to a resist, and inhibit the adhesion of foreign particles to the etched surface. The added amount of a surfactant is preferably 0.0001 to 1 wt %.

Once the etching rate f(x) is obtained for a given high-ionizing acid in combination with an etching solution through a preliminary experiment performed on a heated silicon oxide film, it is possible to readily determine the concentrations of the acid in the solution at which f(x) takes a maximum and minimum.

If the etching rate f(x) is obtained for a given high-ionizing acid, the concentration x of the acid in an etching solution is preferably chosen to be in the range of $x > x_1$, more preferably $x > x_2 - (x_2 - x_1)/2$, because then the compounds derived from cations obtained as a result of dissolution of ingredients contained in an etched glass substrate become highly soluble to the solution.

If the etching rate f(x) is obtained for a given high-ionizing acid, the concentration x of the acid in an etching solution is preferably chosen to be in the range:

$$x_2 - (x_2 - x_1)/2 < x < x_2 + (x_2 - x_1)/2,$$

because then it is possible to prevent the adhesion of crystal precipitates to the etched surface, and to minimize any increase in surface roughness, and to maintain the original transparency of the glass substrate throughout the etching process.

The etching solution according to the invention, adapted for etching a glass substrate containing multiple ingredients, contains as indispensable components, HF and $NH_4F$, and a high-ionizing acid whose dissociation constant is higher than that of HF, and, as needed, a surfactant. Other components may be added to the etching solution, as long as their addition does not interfere with the proper function of the etching solution.

If metal elements are allowed to exist in an etching solution of the invention adapted for etching a glass substrate containing multiple ingredients, the species of the metal elements are not limited to any specific ones but may include any various metals. However, in order to ensure the enhanced solubility of the compounds of cations obtained as a result of dissolution of ingredients of a glass substrate and uniform etching of the glass substrate, their concentration is preferably limited to 1 ppb or lower, more preferably 0.5 ppb or lower, most preferably 0.01 ppb or lower.

A glass substrate containing multiple ingredients may contain any metals, as long as its main ingredient is silicates. However, the etching solution of the invention is particularly effective for a glass substrate which contains, as metal elements, one or more chosen from the group comprising Al, Ba, Ca, Mg, Sb, Sr and Zr.

The glass substrate to be treated by an etching solution of the invention preferably includes those used for the construction of flat panel display devices.

The concentration of HF in an etching solution of the invention is preferably 25 mol/kg or lower.

The concentration of $NH_4F$ in an etching solution of the invention is preferably 0.001 to 11 mol/kg.

If the etching rate f(x) is obtained for a given high-ionizing acid, the concentration x of the acid in an etching solution is preferably chosen to satisfy $x < x_3$ [mol/kg], where $x_3$ represents the maximum concentration at which deposition of crystals on a glass substrate can be prohibited at a temperature appropriate for etching.

The concentration of components included in an etching solution of the invention are preferably adjusted such that precipitation of crystals occurs at 20° C. or lower, because then it is possible to prohibit the precipitation of crystals during the preparation of the etching solution.

EXAMPLES

The method of the invention will be described below more specifically by means of examples. However, the present invention is not limited to those examples.

First, as a fundamental experiment, hydrochloric acid (HCl)-added BHF-based etching solutions were prepared with the concentration of HCl being varied. The compositions of the etching solutions and their features are summarized in Table 1 below.

TABLE 1

| HF (mol/kg) | $NH_4F$ (mol/kg) | Hydrochloric acid (mol/kg) | Rate of etching of glass substrate (23° C.) (Å/min) | Features |
|---|---|---|---|---|
| 0.5 | 1 | 0.25 | 1440 | |
| | | 0.5 | 2260 | Rate of etching of heated oxide film maximum |
| | | 1.25 | 3820 | |
| | | 2.5 | 5000 | Rate of etching of heated oxide film minimum |
| | | 3.25 | 6120 | |
| 1 | 3 | 1 | 3050 | |
| | | 2 | 6700 | Rate of etching of heated oxide film maximum |
| | | 3 | 9580 | |
| | | 4 | 12910 | Rate of etching of heated oxide film minimum |
| | | 5 | 15560 | |
| 3 | 3 | 0.5 | 4230 | |
| | | 1.5 | 8090 | Rate of etching of heated oxide film maximum |
| | | 2.75 | 13640 | |
| | | 4 | 21060 | Rate of etching of heated oxide film minimum |
| | | 4.5 | 22780 | |
| 5 | 4 | 0.5 | 8310 | |
| | | 1.5 | 14480 | Rate of etching of heated oxide film maximum |
| | | 2.25 | 18480 | |
| | | 4 | 25200 | |

The glass substrate used in the experiment included glass substrates to be incorporated in LC displays. The test glass substrates were submitted to EDX (energy dispersion type X-ray analysis) to determine their ingredients. The results are shown in Table 2.

TABLE 2

| Elements | Atomic weight | Contents of individual elements (wt %) |
|---|---|---|
| Si | 28.09 | 30.43 |
| O | 16.00 | 46.65 |
| Al | 26.98 | 8.74 |
| Ba | 137.3 | 9.42 |
| Ca | 40.08 | 2.25 |

TABLE 2-continued

| Elements | Atomic weight | Contents of individual elements (wt %) |
|---|---|---|
| Ga | 69.72 | 0.26 |
| Mg | 24.31 | 0.25 |
| Sb | 121.8 | 0.11 |
| Sn | 118.7 | 0.19 |
| Sr | 87.62 | 1.60 |
| Zr | 91.22 | 0.10 |

Different amounts of HCl were added to a BHF-based etching solution that contained HF at 1 mol/kg and NH$_4$F at 3 mol/kg as shown in Table 1, and the etching rate f(x) of the resulting solutions (which may be abbreviated as 1/3/x solutions) was determined by applying the solutions to a heated silicon oxide film at 23° C., and the f(x) was plotted as a function of the concentration x [mol/kg] of HCl in the solution as shown in FIG. 1.

In FIG. 1, $x_1$ and $x_2$ represent the concentrations of HCl at which the etching rate f(x) determined on a heated silicon oxide film was maximal and minimal respectively, and $x_3$ the maximum concentration of HCl at which no crystal precipitation was present.

An etching solution of the invention having a sufficiently large volume with respect to glass substrates to be etched was applied to glass substrates which contain a given cation-yielding element at different concentrations, and etching was allowed to proceed for a certain period and then the etching solution was stirred to ensure the uniform dispersion of the cation in the solution. The effect of the etched amount on the concentration of the cation in the solution was studied.

The concentration of the cation in an etching solution was determined by ICP-MS (induction-coupled high frequency plasma mass spectroscopy, HP-4500, Yokokawa-Hewlett-Packard).

Figure 2:
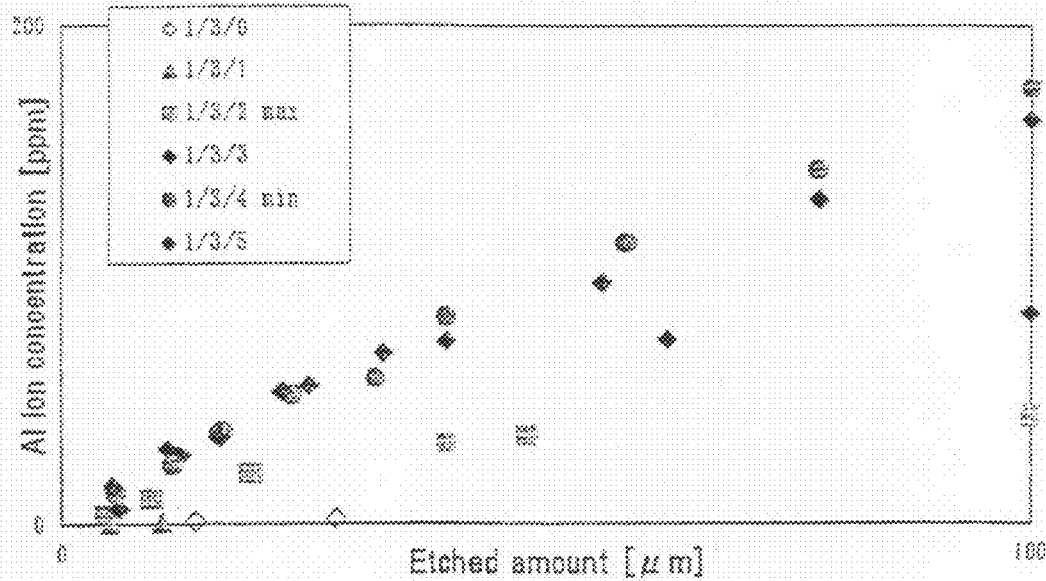
FIG. 2 shows a graph illustrating when acid-added etching solutions with the concentration of acid in the solution being varied are applied to a glass substrate containing Al compounds, with dots relating the concentration of Al ions in the solution with the etched amount.

The concentration of Al ions in an etching solution derived from an etched glass substrate was plotted as a function of the etched amount, and the resulting graph is shown in FIG. 2.

From FIG. 2 it is evident that generally the concentration of Al ions in an etching solution linearly increases with the increase of the etched amount. This suggests that Al ions are uniformly dispersed in the etching solution.

Various etching solutions were applied to the same glass substrate comprising Al compounds, and similar relationships were plotted. Then, it was found that certain etching solutions gave the relationships whose gradient is lower than the general linear gradient. This shows that, with the use of such etching solutions, Al compounds contained in the glass substrate dissolve in the etching solution to produce Al salts (e.g., aluminum fluorides) which, being hardly soluble to the solution, crystallize to precipitate.

As seen from the above description, it is possible to evaluate, for a given etching solution, the solubility of each cation-yielding element contained in a glass substrate by determining the same relationship as above for the etching solution.

Figure 3:
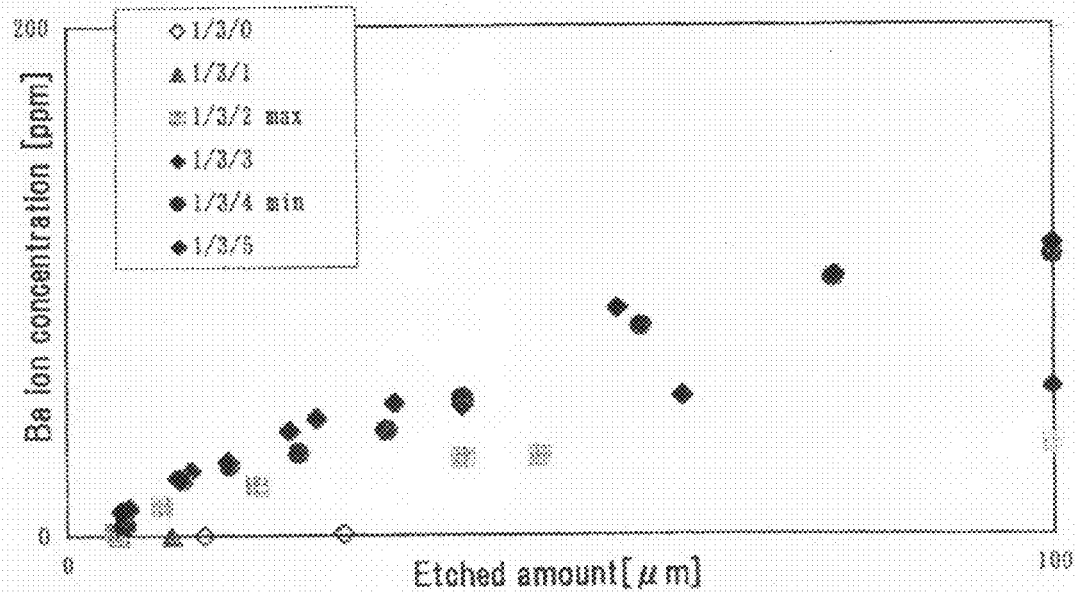
FIG. 3 shows a plot illustrating when acid-added etching solutions with the concentration of acid in the solution being varied are applied to a glass substrate containing Ba compounds, with dots relating the concentration of Ba ions in the solution with the etched amount.
Figure 4:
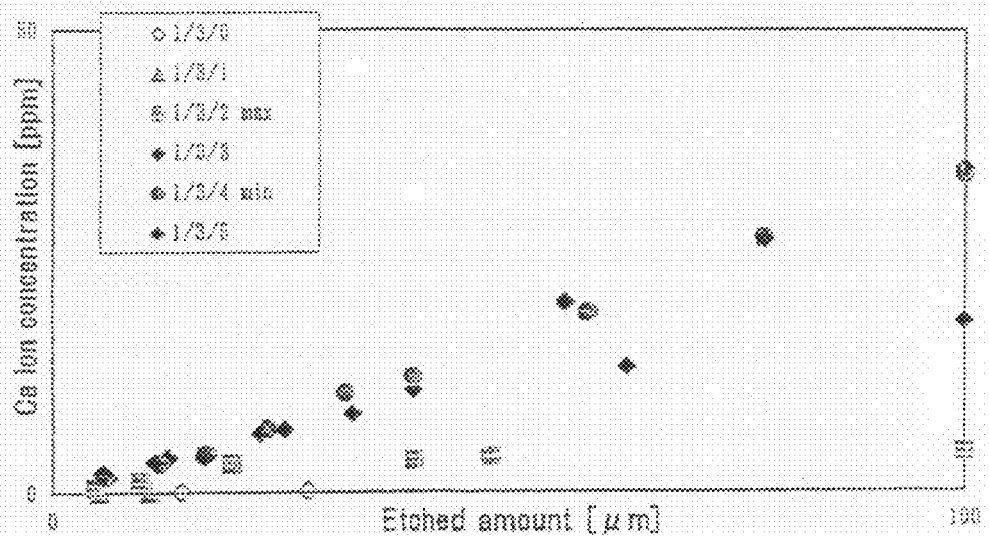
FIG. 4 shows a graph illustrating when acid-added etching solutions with the concentration of acid in the solution being varied are applied to a glass substrate containing Ca compounds, with dots relating the concentration of Ca ions in the solution with the etched amount.
Figure 5:
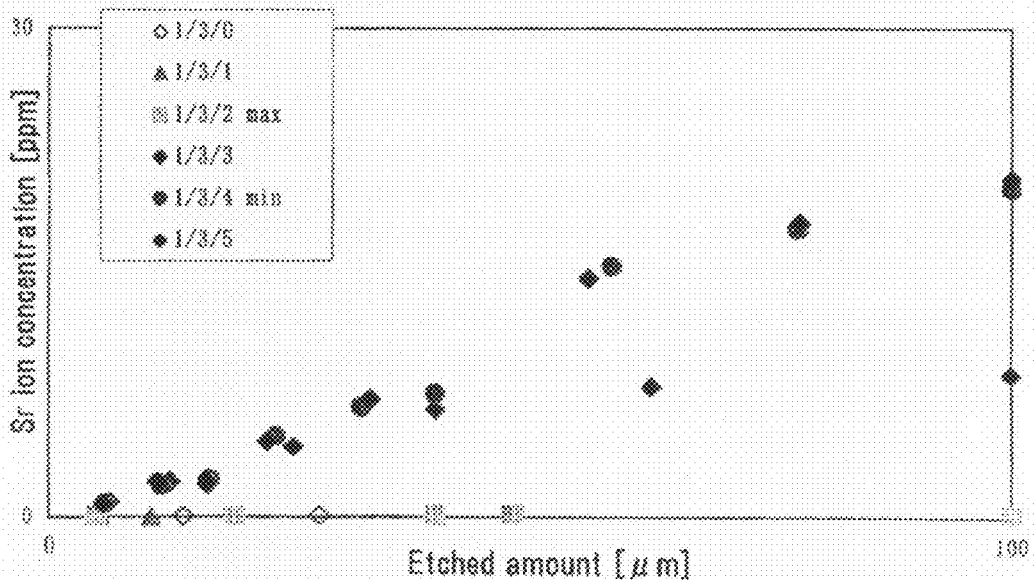
FIG. 5 shows a plot illustrating when acid-added etching solutions with the concentration of acid in the solution being varied are applied to a glass substrate containing Sr compounds, with dots relating the concentration of Sr ions in the solution with the etched amount.

A BHF-based etching solution comprising HF at 1.0 mol/kg and NH$_4$F at 3.0 mol/kg was prepared, and different amounts of HCl was added to the solution to prepare BHF-based etching solutions with the concentration x of HCl being varied. The test etching solutions were applied to a glass substrate containing cation-yielding elements. For each cation derived from the glass substrate, the relationship of its concentration in the solution with the etched amount of the substrate was plotted as for Al shown above. FIGS. 3, 4 and 5 show the relationships thus obtained for Ba, Ca and Sr, respectively.

Inspection of FIGS. 2, 3, 4 and 5 shows that, when the BHF-based solutions comprising HF at 1.0 mol/kg and NH$_4$F at 3.0 mol/kg, where the concentration x of HCl was varied, were applied to the glass substrate containing Al, Ba, Ca, and Sr as main cation-yielding elements, the solubility of the salts of those elements to the etching solution increases when x is equal to $x_1$.

Further, the BHF-based solutions comprising HF at 1.0 mol/kg and NH$_4$F at 3.0 mol/kg, where the concentration x of HCl was varied, were applied to a heated silicon oxide film at 23° C., and the etching rate f(x) was plotted as a function of the concentration x [mol/kg] of HCl in the solution. As a consequence it was found that $x_1$ or the concentration of HCl which gave a maximum of f(x) was $x_1$=2 mol/kg, and $x_2$ or the concentration of HCl which gave a minimum of f(x) was $x_2$=4 mol/kg. Since the concentration x of HCl is preferably in the range:

$$x \geq x_2-(x_2-x_1)/2,$$

the preferable range in this case can be obtained by replacing $x_1$ and $x_2$ by 2 and 4 respectively, that is, $$x \geq 4-(4-2)/2=3, \text{ or } x \geq 3.$$

Indeed, the graphs show that, if the concentration x of HCl is chosen to satisfy x≧3, solubility of the salts of the main cations derived from the glass substrate to the etching solution is enhanced.

Incidentally, the solubility of silicon (Si) and silicates (SiO$_2$) or the main ingredients of a glass substrate to the etching solutions under study was excellent.

With regard to the metal elements contained in a glass substrate, it has been known that their fluorides are more insoluble to water than their other halogenated salts such as chlorides. Thus, if it is possible to introduce a halogen atom other than F in the present reaction system, and to replace thereby part of the fluorides with salts of the substitutive halogen, then the crystallization of fluorides of cations derived from a glass substrate which are hardly soluble to water, will be effectively avoided.

If HCl is added to an etching solution, H$^+$ ions and Cl$^-$ ions will be added to existent ions in the solution. Addition of H$^+$ ions to the reaction system disturbs the existent acid-base equilibrium such that the concentration of F$^-$ ions in the solution is lowered. On the other hand, addition of Cl$^-$ ions produces, instead of fluorides of cation-yielding elements contained in a glass substrate, the chlorides of those cation-yielding elements which are more soluble to the etching solution, which accounts for the reduction of crystal precipitation in an HCl-added etching solution.

It was found, if the acidity contributed by HCl in an etching solution is equal to that of HF, with the increase of the ratio of chloride content to fluorine content (Cl/F ratio), the solubility of resulting halogenated salts to the solution is more enhanced.

The present inventors prepared HCl-added etching solutions with the concentration x of HCl being varied whose composition was as shown in Table 1. The etching solutions were applied to a heated silicon oxide film at 23° C., and the etching rate f(x) was plotted as a function of the concentration x [mol/kg] of HCl. Then, they revealed that, if f(x) takes a maximum when x=$x_1$, and a minimum when x=$x_2$, an etching solution in which the concentration x of HCl is in the range of:

$$x \geq x_2-(x_2-x_1)/2$$

gives an environment where the solubility of the salts of cation-yielding elements contained in a glass substrate to the solution is enhanced with an increase of the concentration x of HCl.

Next, the method of evaluating the micro-roughness of the surface of an etched glass substrate will be disclosed.

A BHF-based etching solution comprising HF at 1.0 mol/kg and $NH_4F$ at 3.0 mol/kg was prepared, to which different amounts of HCl were added to vary its concentration x. The resulting acidified BHF-based etching solution was applied to a glass substrate until the surface of the glass substrate was etched away by 25, 50 or 100 μm. The micro-roughness of the etched surface was evaluated by determining the Ra value of the surface. The results are shown in Table 3. The micro-roughness (Ra value) of an etched surface was determined with an instrument adapted for the purpose (α-step 250, Tencor).

TABLE 3

| Acid concentration | Etched amount of glass substrate (Å) | | |
|---|---|---|---|
| (mol/kg) | 25 μm | 50 μm | 100 μm |
| 1 | 22 | 520 | 1200 |
| 2 | 38 | 44 | 70 |
| 3 | 38 | 44 | 70 |
| 3.5 | 33 | 47 | 65 |
| 3.75 | 30 | 44 | 63 |
| 4 | 12 | 18 | 22 |
| 4.25 | 24 | 39 | 53 |
| 4.5 | 26 | 43 | 56 |
| 5 | 29 | 46 | 58 |

It is shown in Table 3 that, with regard to the BHF-based etching solutions containing HF at 1.0 mol/kg and $NH_4F$ at 3.0 mol/kg with different amounts of HCl supplemented, if the concentration x of HCl is in the range of 3<x<5, the increment of micro-roughness with the increase of etched amount is inhibited. The same BHF-based etching solutions containing HF at 1.0 mol/kg and $NH_4F$ at 3.0 mol/kg with the concentration x of HCl being varied were applied to a heated silicon oxide film at 23° C., and the etching rate f(x) as a function of the concentration x [mol/kg] of HCl was determined. It was found that the etching rate f(x) takes a maximum when $x=x_1$ or 2 mol/kg, and a minimum when $x=x_2$ or 4 mol/kg. When these values are put into the above inequalities, $$x \geq x_2-(x_2-x_1)/2=4-(4-2)/2=3 \ (x>3)$$

$$x \leq x_2+(x_2-x_1)/2=4+(4-2)/2=5 \ (x<5).$$

This shows that, for the HCl-added, BHF-based etching solutions, if the concentration x of HCl in the solutions is in the range of 3<x<5, etching by the solutions proceeds so smoothly and uniformly that the increase of micro-roughness with the increase of etching amount is inhibited.

If the concentration x of HCl is below the above range, salts of cation-yielding elements derived from a glass substrate have such a low solubility to the etching solution that they easily crystallize and deposit on the surface of the substrate, which causes the surface roughness to be increased with the increase of etching amount.

To the BHF-based etching solution containing HF at 1.0 mol/kg and $NH_4F$ at 3.0, $HNO_3$ or $H_2SO_4$ was added instead of HCl and the same type of experiment was carried out. It was found that those acids have the same effect as HCl.

The present inventors applied the various etching solutions, whose composition is as shown in Table 1, to glass substrates and examined the micro-roughness (Ra value) of etched surfaces in the same manner as described above. In a separate experiment, the etching solutions were applied to a heated silicon oxide film at 23° C., and the etching rate f(x) as a function of the concentration x [mol/kg] of HCl was plotted, and $x_1$ or the concentration of HCl at which the etching rate f(x) takes a maximum and $x_2$ or the concentration of HCl at which the etching rate f(x) takes a minimum were determined. Then, it was found that, for a given HCl-added, BHF-based etching solution, if the concentration x of HCl in the solution is chosen to satisfy the inequality:

$$x_2-(x_2-x_1)/2<x<x_2+(x_2-x_1)/2,$$

the etching solution can etch glass substrates so smoothly and uniformly that the increase of micro-roughness with the increase of etching amount is inhibited.

To the BHF-based etching solution containing HF at 1.0 mol/kg and $NH_4F$ at 3.0, $HNO_3$ or $H_2SO_4$ was added instead of HCl and the same type of experiment was carried out. It was found that those acids have the same effect as does HCl.

If a BHF-based etching solution to which HCl is added, such that the concentration x of HCl in the solution satisfies the above inequality, is applied to a glass substrate containing multiple ingredients as those used for the construction of flat panel display devices, the solubility of salts of cations derived from the glass substrate to the solution is enhanced, and an increase of micro-roughness with the increase of etching amount is inhibited. Thus, with such an etching solution, it is possible to uniformly etch a glass substrate containing multiple ingredients without evoking crystal precipitation and increased surface roughness.

If a BHF-based etching solution is prepared, different amounts of HCl are added to the solution, the resulting etching solutions with the concentration x of HCl varied are applied to a heated silicon oxide film at 23° C., the etching rate f(x) is plotted as a function of the concentration x [mol/kg] of HCl, and $x_1$ or the concentration of HCl at which the etching rate f(x) takes a maximum and $x_2$ or the concentration of HCl at which the etching rate f(x) takes a minimum are determined, then the same BHF-based solution to which HCl is added such that the concentration x of HCl in the solution satisfies the following inequality:

$$x_2-(x_2-x_1)/2<x<x_2+(x_2-x_1)/2$$

will ensure the uniform processing of glass substrates.

INDUSTRIAL APPLICABILITY

According to the present invention, it is possible to process glass substrates containing multiple ingredients as those used for the construction of flat display devices without inducing crystal precipitation and/or an increase in surface roughness.

An etching solution according to the present invention can also be used for cleaning filters. If a conventional etching solution is used for etching glass substrates, the solution will contain fluorides of cations, derived from the glass substrates, as precipitates. The etching solution is then passed through a filter to remove fluorides. However, after repeated use, the filter will be clogged. If such a filter is rinsed with an etching solution of the invention, fluorides depositing on the fiber network of the filter will dissolve in the solution and the filter will be cleaned sufficiently to be reused.

If an acid-added etching solution in which the concentration of the acid is adjusted according to the present invention is applied to a glass substrate containing multiple ingredients, uniform etching of the surface of the substrate is achieved without causing an increase in the surface roughness. Therefore, if the surface of a glass substrate which has been etched by means of an etching solution prepared according to the invention is inspected, and it is found to exhibit considerable roughness, it is possible to conclude that the glass substrate has a certain inherent flaw such as entrapped air bubbles.

Accordingly, it is possible to identify glass substrates having an inherent flaw, by checking the surface roughness of the substrates after subjecting them to the etching by means of an etching solution prepared according to the invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A surface treating method, comprising:
providing a glass substrate containing cations and their cation oxides; and
applying a surface treatment solution including HF, $NH_4F$, and at least one acid whose dissociation constant is larger than that of HF at a concentration of $x > x_1$
where x is a concentration of the at least one acid in mol/kg, and
f(x) is an etching rate of the surface treatment solution on a heated silicon dioxide film at the concentration of x, wherein $x_1$ gives a maximum f(x).

2. The surface treating method as described in claim 1, wherein said surface treatment solution comprises as a uniform mixture, in addition to HF and $NH_4F$, at least one inorganic acid either monovalent or multivalent whose dissociation constant is larger than that of HF.

3. The surface treating method as described in claim 1, wherein the acid whose dissociation constant is larger than that of HF is composed of at least one acid selected from the group consisting of HCl, HBr, $NHO_3$ and $H_2SO_4$.

4. The surface treating method as described in claim 1, wherein said surface treatment solution further comprises a surfactant at 0.0001 to 1 wt %.

5. The surface treating method as described in claim 1, wherein said surface treatment solution includes HF at 25 mol/kg or lower.

6. The surface treating method as described in claim 1, wherein said surface treatment solution includes $NH_4F$ at 0.031 to 11 mol/kg.

7. The surface treating method as described in claim 1, wherein:
the surface treatment solution is adapted so that if etching is performed at an appropriate temperature using an acid etching solution with the concentration x (mol/kg) of acid being varied and it is found that crystal precipitation remains inhibited as long as x is below $x_3$ or the maximum effective concentration, then the concentration x of acid in the solution is adjusted to be $x < x_3$.

8. A surface treating method, comprising:
providing a glass substrate containing multiple ingredients; and
applying a surface treatment solution including HF, $NH_4F$, and at least one acid whose dissociation constant is larger than that of HF such that the solution is adapted to be applied to a heated silicon oxide film having a certain thickness, and a concentration x (mol/kg) of the acid in the solution is adjusted to be in a range:

$$x_2 - (x_2-x_1)/2 < x < x_2 + (x_2-x_1)/2$$

when an etching rate f(x) (Å/min) is plotted as a function of the concentration x of the acid in the solution, it is found that f(x) takes maximum $f(x_1)$ when $x=x_1$, and a minimum $f(x_2)$ when $x=x_2$ ($X_1 < X_2$).

9. The surface treating method as described in claim 8, wherein said surface treatment solution is a uniform mixture.

10. The surface treating method as described in claim 8, wherein the acid whose dissociation constant is larger than that of HF is composed of at least one acid selected from the group consisting of HCl, HBr, $NHO_3$ and $H_2SO_4$.

11. The surface treating method as described in claim 8, wherein said surface treatment solution further comprises a surfactant at 0.0001 to 1 wt %.

12. The surface treating method as described in claim 8, wherein said surface treatment solution includes HF at 25 mol/kg or lower.

13. The surface treating method as described in claim 8, wherein said surface treatment solution includes $NH_4F$ at 0.031 to 11 mol/kg.

14. The surface treating method as described in claim 8, wherein:
the surface treatment solution is adapted so that if etching is performed at an appropriate temperature using an acid etching solution with the concentration x (mol/kg) of acid being varied and it is found that crystal precipitation remains inhibited as long as x is below $x_3$ or the maximum effective concentration, then the concentration x of acid in the solution is adjusted to be $x < x_3$.

15. The surface treating method as described in claim 1, wherein said surface treatment solution includes HF at 0.5 to 5 mol/kg.

16. The surface treating method as described in claim 1, wherein said surface treatment solution includes $NH_4F$ at 1 to 4 mol/kg.

* * * * *

UNITED STATES PATENT AND TRADEMARK OFFICE
CERTIFICATE OF CORRECTION

PATENT NO. : 8,066,898 B2
APPLICATION NO. : 12/237981
DATED : November 29, 2011
INVENTOR(S) : Hirohisa Kikuyama et al.

It is certified that error appears in the above-identified patent and that said Letters Patent is hereby corrected as shown below:

Title page, Item (75) Inventors,

"Masayuki Miyashita, Aizumiootsu (JP);"

should be changed to

--Masayuki Miyashita, Izumiootsu (JP);--

Signed and Sealed this
Twenty-fourth Day of April, 2012

David J. Kappos
*Director of the United States Patent and Trademark Office*